(12) United States Patent
Nam et al.

(10) Patent No.: US 8,687,162 B2
(45) Date of Patent: Apr. 1, 2014

(54) LIQUID CRYSTAL DISPLAY DEVICE AND METHOD FOR FABRICATING THE SAME

(75) Inventors: Seung-Hee Nam, Paju-si (KR); Young-Ki Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 420 days.

(21) Appl. No.: 12/912,500

(22) Filed: Oct. 26, 2010

(65) Prior Publication Data

US 2011/0157533 A1 Jun. 30, 2011

(30) Foreign Application Priority Data

Dec. 30, 2009 (KR) .................. 10-2009-0134811

(51) Int. Cl.
*G02F 1/1345* (2006.01)
*G02F 1/1343* (2006.01)
*G02F 1/1362* (2006.01)

(52) U.S. Cl.
CPC ...... *G02F 1/136286* (2013.01); *G02F 1/13452* (2013.01); *G02F 1/1345* (2013.01)
USPC .......................................... 349/149; 349/139

(58) Field of Classification Search
CPC .......... G02F 1/136286; G02F 1/13452; G02F 1/1345

USPC .......................................... 349/139, 149, 151
See application file for complete search history.

(56) References Cited

U.S. PATENT DOCUMENTS

| 6,774,973 B2 * | 8/2004 | Ko ................................ 349/153 |
| 2005/0088602 A1 * | 4/2005 | Park et al. ..................... 349/149 |

FOREIGN PATENT DOCUMENTS

| KR | 10-2006-0017161 | | 2/2006 | |
| KR | 1020060017161 A | * | 2/2006 | ............ G02F 1/1345 |

* cited by examiner

*Primary Examiner* — Nathanael R Briggs
(74) *Attorney, Agent, or Firm* — McKenna Long & Aldridge, LLP

(57) ABSTRACT

The present invention provides a liquid crystal display device for reducing line resistance of an line on glass (LOG) type signal line, and a method for fabricating the same. The liquid crystal display device includes signal lines formed at a picture display part, and an LOG type signal line formed at a peripheral region of the picture display part to have a width greater than the signal line and a plurality of first openings spaced at regular intervals for supplying a required driving signal to a drive IC to drive the signal lines.

3 Claims, 16 Drawing Sheets

LIQUID CRYSTAL DISPLAY DEVICE AND METHOD FOR FABRICATING THE SAME

CROSS REFERENCE TO RELATED APPLICATION

This application claims the benefit of Korean Patent Application No. 10-2009-0134811, filed on Dec. 30, 2009, which is hereby incorporated by reference as if fully set forth herein.

BACKGROUND OF THE DISCLOSURE

1. Field of the Disclosure

The present invention relates to a liquid crystal display device for reducing line resistance of an line on glass (LOG) type signal line, and a method for fabricating the same.

2. Discussion of the Related Art

Recently, various kinds of flat display devices have been developed, which can reduce weight and volume that are disadvantages of a cathode ray tube. As the flat display device, there are a liquid crystal display device, a field emission display device, a plasma display panel, an electroluminescence EL display device, and so on.

The flat display device is provided with a plurality of thin films formed by mask process including a deposition step, an exposure step, a development step, and etching step, and so on. However, since the mask process has a complicate fabrication process, the mask process increases a production cost. Consequently, researches for forming the thin film by using a printing process utilizing a printing roller are under progress.

The printing process is a process in which a printing liquid is coated on a blanket on the printing roller, an organic liquid pattern is formed on the printing roller by using a cliché having a depressed pattern and a relieved pattern, and the organic liquid pattern is transcribed to a substrate, thereby forming a desired thin film.

In this instance, referring to FIG. 1, depressed patterns 11 and 13 having different widths respectively matched to line widths of first and second thin film layers are formed on the cliché 5 for forming first and second thin film layers of the same material having line widths different from each other.

If the printing roller 1 having a printing liquid 3 coated thereon is rolled on the cliché 5, the printing roller 1 is brought into contact A with a bottom surface of the depressed pattern 11 having a great line width to transcribe the printing liquid 3 from the printing roller 1 to the bottom surface of the depressed pattern 11 having the great line width, resulting to lose the printing liquid 3.

Particularly, in a case gate drive ICs contact with the liquid crystal panel through a gate TCP, an LOG (Line On Glass) type signal line which supplies gate signals to the gate drive ICs is formed of a material the same with the gate line. The LOG type signal line is lengthy for supplying a gate signal to each of a plurality of gate drive ICs, resulting to have a line width greater than the gate line for compensating for line resistance increased accordingly.

In this case, referring to FIG. 1, the printing liquid to form the LOG type signal line becomes to contact with the bottom surface of the cliché, resulting to lose the printing liquid. Consequently, there has been a problem in that the width of the LOG type signal line is reduced, increasing the line resistance of the LOG type signal line.

SUMMARY OF THE DISCLOSURE

Accordingly, the present invention is directed to a liquid crystal display device, and a method for fabricating the same.

An object of the present invention is to provide a liquid crystal display device for reducing line resistance of an LOG type signal line, and a method for fabricating the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes signal lines formed at a picture display part, and an LOG (line on glass) type signal line formed at a peripheral region of the picture display part to have a width greater than the signal line and a plurality of first openings spaced at regular intervals for supplying a required driving signal to a drive IC to drive the signal lines.

The liquid crystal display device further includes a supplementary electrode overlapped with the LOG type signal line, with a gate insulating film disposed therebetween, a first contact hole passed through a protective film formed to cover a thin film transistor connected to the signal lines and the gate insulating film to expose the LOG type signal line, a second contact hole passed through the protective film to expose the supplementary electrode, and a contact electrode connected between the supplementary electrode and the LOG type signal line through the first and second contact holes.

The LOG type signal line is formed of the same material on the same plane with a gate electrode of the thin film transistor, the supplementary electrode is formed of the same material on the same plane with a drain electrode of the thin film transistor, and the contact electrode is formed of the same material on the same plane with a pixel electrode connected to the thin film transistor.

The supplementary electrode has second openings formed alternately with the first openings, and at least one of the first and second openings is formed in a slit or hole type.

In another aspect of the present invention, a method for fabricating a liquid crystal display device includes the steps of coating a printing liquid to a printing roller, rolling the printing roller having the printing liquid coated thereon on a cliché to pattern the printing liquid, and rolling the printing roller to transcribe the printing liquid patterned thus to a substrate to form a signal line at a picture display part and an LOG (line on glass) type signal line at a peripheral region of the picture display part to have a width greater than the signal line and a plurality of first openings spaced at regular intervals for supplying a required driving signal to a drive IC to drive the signal lines.

The method further includes the steps of forming a supplementary electrode overlapped with the LOG type signal line, with a gate insulating film disposed therebetween, forming a first contact hole passed through a protective film to cover a thin film transistor connected to the signal lines and the gate insulating film to expose the LOG type signal line, and a second contact hole passed through the protective film to expose the supplementary electrode, and forming a contact electrode connected between the supplementary electrode and the LOG type signal line through the first and second contact holes.

The LOG type signal line is formed of the same material on the same plane with a gate electrode of the thin film transistor, the supplementary electrode is formed of the same material on the same plane with a drain electrode of the thin film transistor, and the contact electrode is formed of the same material on the same plane with a pixel electrode connected to the thin film transistor.

The openings are formed spaced from each other each at a width the same with a width enough to prevent the printing liquid from coming into contact with a bottom surface of the cliché.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

Figure 1:
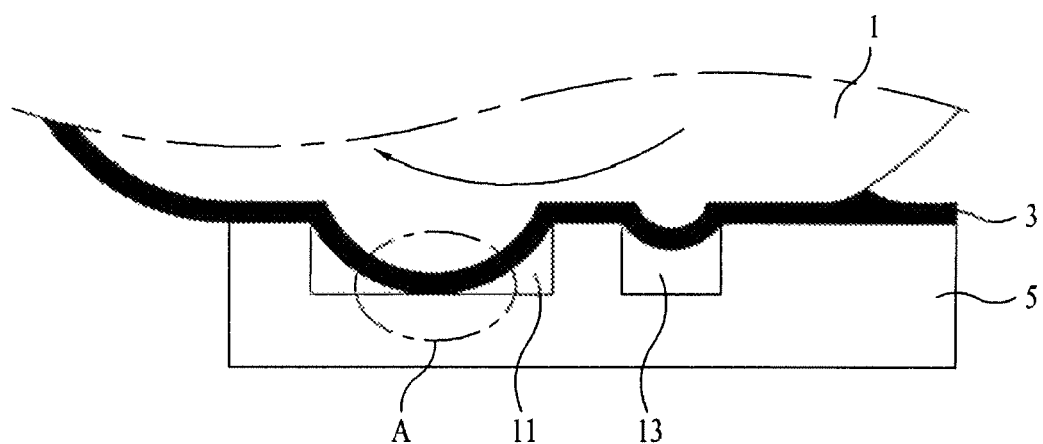
FIG. 1 illustrates a section for explaining a method for forming a thin film layer by printing with a related art cliché.
Figure 2:
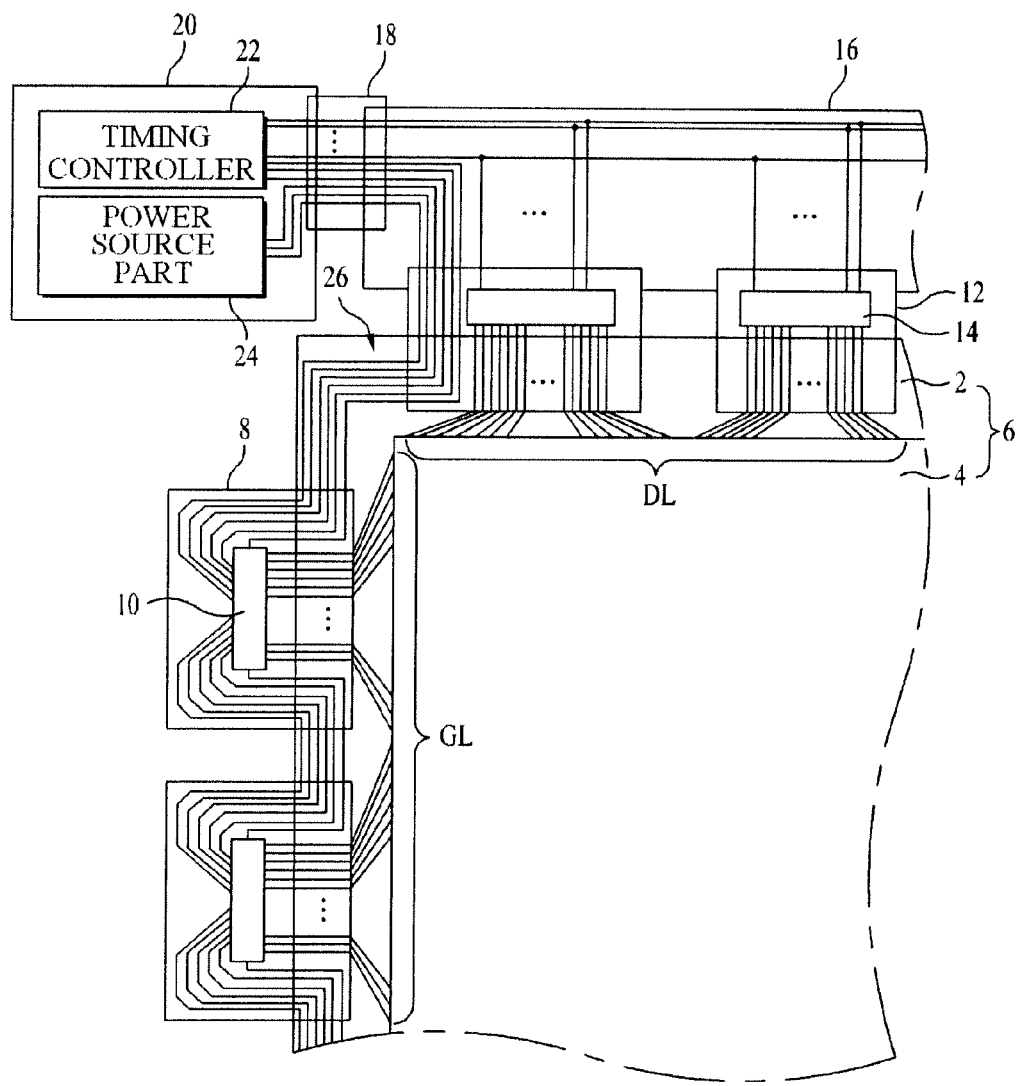
FIG. 2 illustrates a diagram of a liquid crystal display device in accordance with a preferred embodiment of the present invention.

FIG. 2 illustrates a diagram of an LOG type liquid crystal display device in accordance with a preferred embodiment of the present invention.

Referring to FIG. 2, the LOG type liquid crystal display device includes a liquid crystal panel 6 having a liquid crystal cell matrix, a gate drive IC 10 for driving the gate lines GL of the liquid crystal panel 6, a data drive IC 14 for driving data lines DL of the liquid crystal panel 6, a timing controller 22 for controlling the gate drive IC 10 and the data drive IC 14, and a power source part 24 for generating a driving voltage required for driving the liquid crystal display device.

The power source part 24 generates driving voltages (a gate high voltage VGH and a gate low voltage VGL) required for driving the liquid crystal display device, a reference gamma voltage, a common voltage VCOM by using a voltage received from a system power source part (not shown) and forwards to the timing controller 22, the data drive IC 14, the gate drive IC 10.

The timing controller 22 relays video data R, G, B from a graphic card to the data drive IC 14. Along with this, the timing controller 22 generates timing signals for controlling timings of the data and gate drive ICs 14 and 10 and control signals in response to a control signal from the graphic card.

The liquid crystal panel 6 has a thin film transistor substrate 2 and a color filter substrate 4 bonded together with liquid crystals disposed therebetween. The liquid crystal panel 6 has a liquid crystal cell provided at every region defined as the gate lines GL and the data lines DL cross so as to be driven by the thin film transistor independently. The thin film transistor supplies a pixel signal from the data line DL to the liquid crystal cell in response to a scan signal from the gate line GL.

The data drive ICs 14 are connected to the data lines DL through data TCPs 12 and data pad units of the liquid crystal panel 6. The data drive ICs 14 convert the pixel data into an analog pixel signal and forwards the analog pixel signal to the data lines DL. To do this, the data drive ICs 14 receive a data control signal, a pixel data and power source signals from the timing controller 22 and the power source part 24 on a main PCB 20 through a data PCB 16 and an FPC 18.

The gate drive ICs 10 are connected to the gate lines GL through gate TCPs 8 and gate pad units of the liquid crystal panel 6. The gate drive ICs 10 supply the scan signal of a gate high voltage VGH to the gate lines GL in succession. The gate drive ICs 10 also supply a gate low voltage VGL to the gate lines GL in periods except a period in which the gate drive ICs 10 supply the scan signal of a gate high voltage VGH to the gate lines GL.

To do this, the gate control signals and the power source signals from the timing controller 22 and the power source part 24 are supplied to the data TCP 12 through the data PCB 16. The gate control signals and the power source signals supplied through the data TCP 12 are supplied to the gate TCP 8 through an LOG type signal line group 26 formed at a peripheral region of the thin film transistor substrate 2. The gate control signals and the power source signals supplied to the gate TCP 8 are supplied to the gate drive IC 10 through input terminals on the gate drive IC 10 and used therein. And, the gate control signals and the power source signals are forwarded through output terminals on the gate drive IC 10 and supplied to the gate drive IC 10 mounted on the next gate TCP 8 through the gate TCP 8 and the LOG type signal line group 26.

In general, the LOG type signal line group 26 has signal lines for supplying gate power source signals supplied from the power source part (not shown), such as the gate low voltage VGL, the gate high voltage VGH, the common voltage VCOM, a base driving voltage VCC; and gate control signals supplied from the timing controller (not shown), such as a gate start pulse GSP, a gate shift clock signal GSC, and a gate enable signal GOE.

Figure 3:
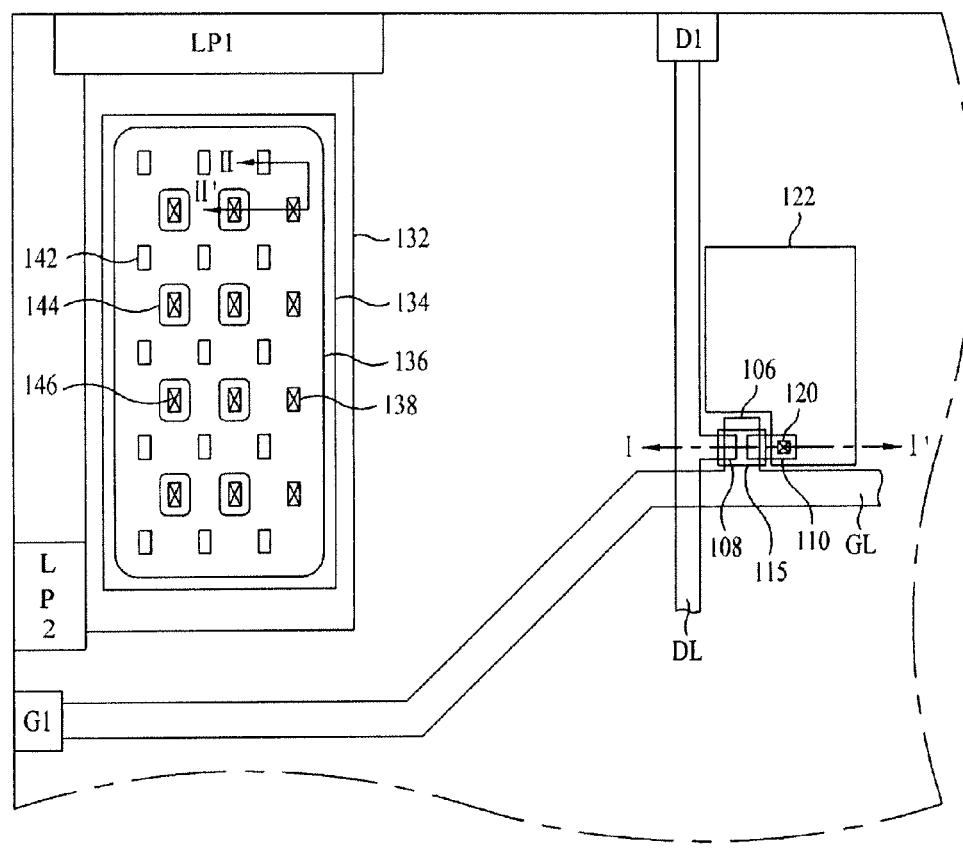
FIG. 3 illustrates a plan view of the thin film transistor substrate of the liquid crystal display device in FIG. 2.
Figure 4:
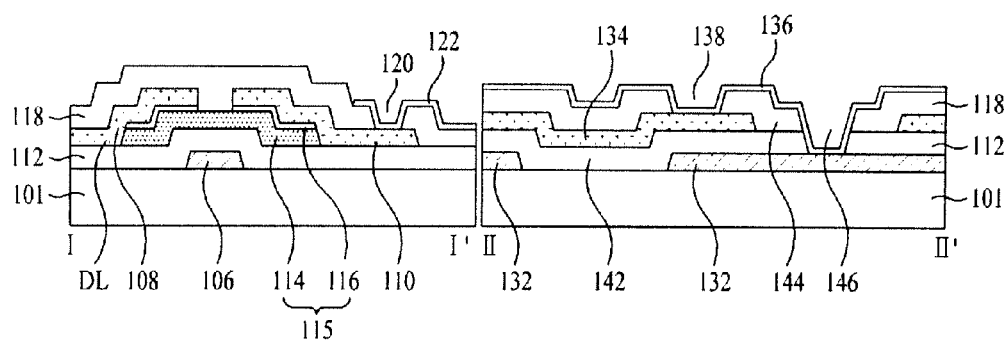
FIG. 4 illustrates sections of the thin film transistor substrate across lines I-I' and II-II' in FIG. 3, respectively.

Referring to FIGS. 3 and 4, each of LOG type signal lines 132 of the LOG type signal line group 26 is formed of the same material with the gate electrode 196 on a same plane with the gate electrode 196. For an example, the LOG type signal line 132 has single layer or a stack of at least two layers formed of metal, such as Mo, Ti, Cu, AlNd, Al, Cr, an Mo alloy, a Cu alloy and an Al alloy.

Figure 5:
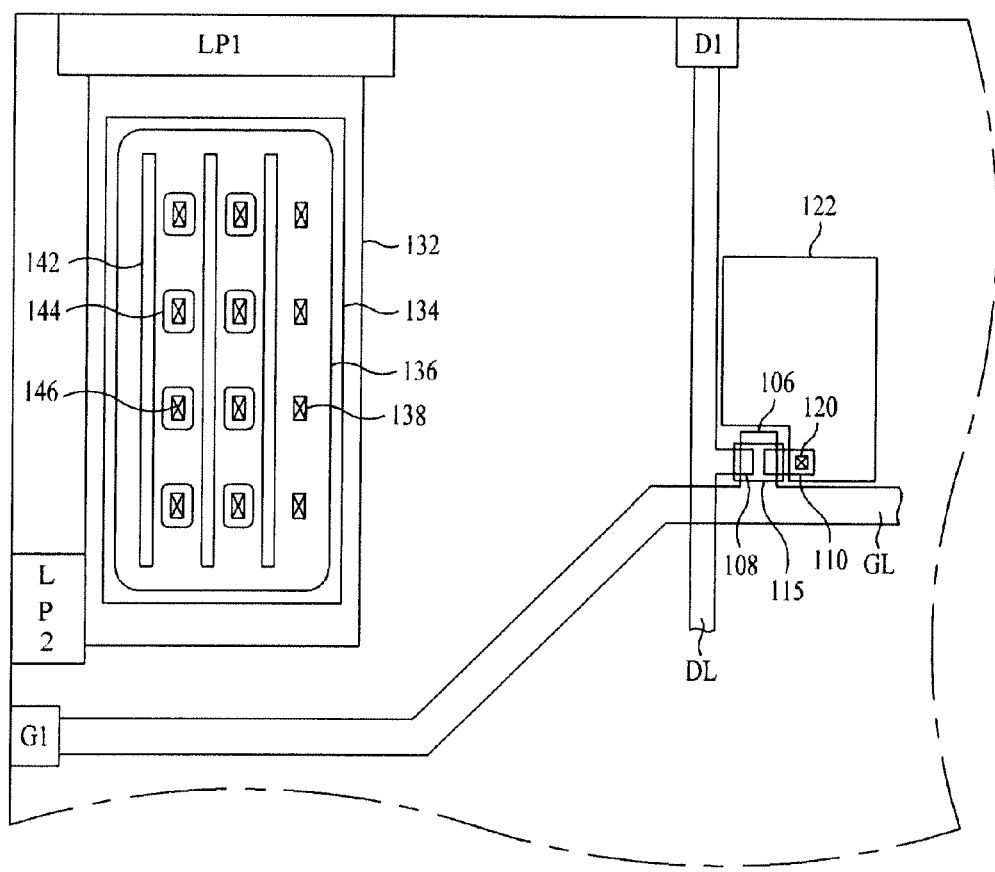
FIG. 5 illustrates a plan view of a variation of the first opening in FIG. 3.

The LOG type signal line 132 has first openings 142 each in a type of a hole as shown in FIG. 3, or each in a type of a slit as shown in FIG. 5. The first openings 142 are formed to have spacing between the first openings 142 enough to prevent the printing liquid from coming into contact with a bottom surface of a cliché in formation of the LOG type signal line 132. The LOG type signal line 132 is formed between a first LOG pad LP1 connected to the data TCP 12 together with the data pads D1 the data signal is supplied thereto and a second LOG pad LP2 connected to the gate TCP 8 together with gate pads G1 the gate signal is supplied thereto and connected to the first and second LOG pads LP1 and LP2.

A supplementary electrode 134 is formed of the same material and on the same plane with the data line DL. For an example, the supplementary electrode 134 has single layer or a stack of at least two layers formed of metal, such as Mo, Ti, Cu, AlNd, Al, Cr, an Mo alloy, a Cu alloy, and an Al alloy. The supplementary electrode 134 has a plurality of second openings 144 each in a type of a hole or a slit formed alternately with the first openings 142. The second openings 144 is spaced at regular intervals between the second openings 144 enough to prevent the printing liquid from coming into contact with the bottom surface of the cliché in formation of the supplementary electrode 134.

The contact electrode 136 is formed of the same material and on the same plane with the pixel electrode 122. The contact electrode 136 is connected to the LOG type signal line 132 through a first contact hole 146 and to the supplementary electrode 134 through a second contact hole 138. The first contact hole 146 is passed through the protective film 118 and a gate insulating film 112 positioned in the second opening 144 to expose the LOG type signal line 132, and the second contact hole 138 is passed through the protective film 118 to expose the supplementary electrode 134.

Thus, the LOG type signal line 132 is connected to the supplementary electrode 134 electrically through the contact electrode 136. Accordingly, since a resistance component of the LOG type signal line 132 is compensated by the supplementary electrode 134 and the contact electrode 136, the line resistance of the LOG type signal line 132 can be reduce, significantly.

FIGS. 6A to 11B illustrate plan views and sectional views for describing a method for fabricating the LOG type liquid crystal display device in FIG. 3 or 4.

Figure 6A:
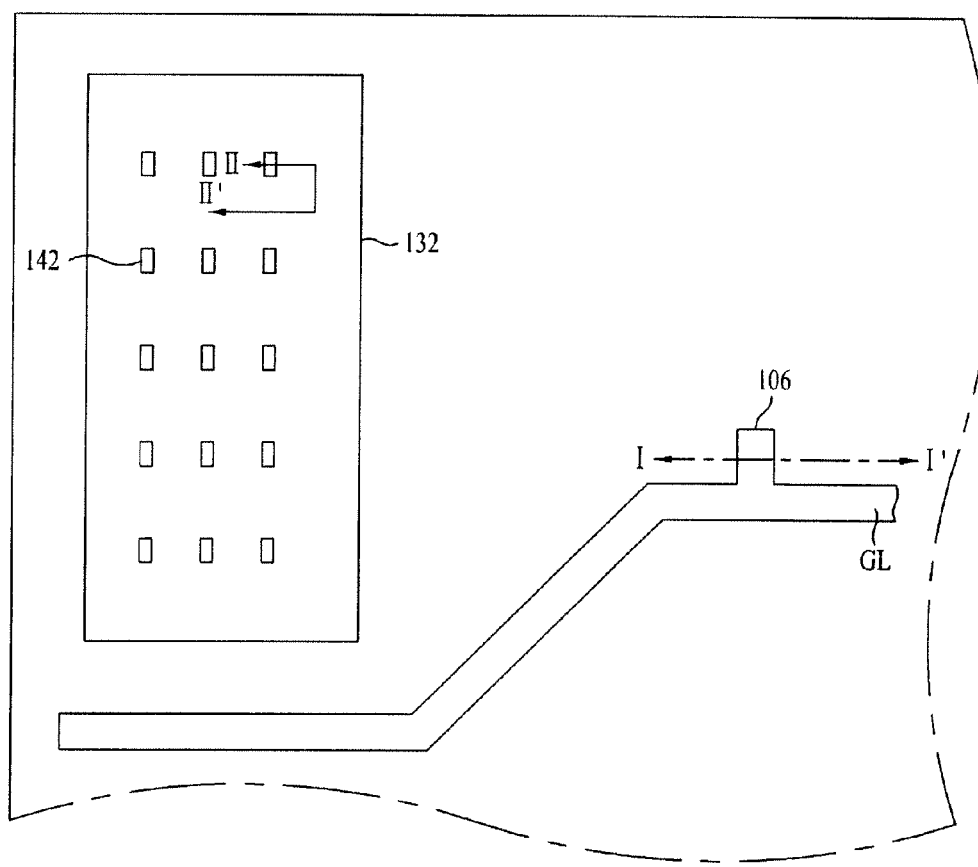
FIGS. 6A and 6B illustrate a plan view and a sectional view for explaining a method for forming the gate metal pattern shown in FIG. 3 or 4.
Figure 6B:
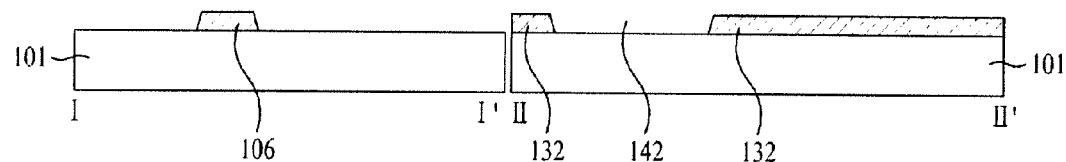

Referring to FIGS. 6A and 6B, an LOG type signal line 132 having a first opening 142, and a gate pattern group having a gate line GL and a gate electrode 106 are formed on a substrate.

Figure 7A:
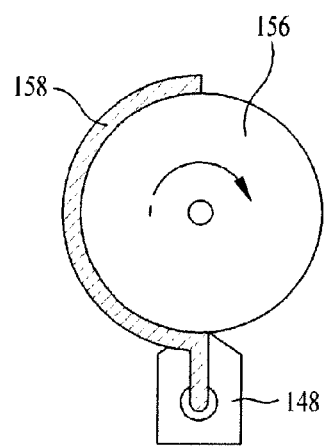
FIGS. 7A to 7C illustrate sections for explaining a method for forming the gate metal pattern shown in FIGS. 6A and 6B, in detail.
Figure 7B:
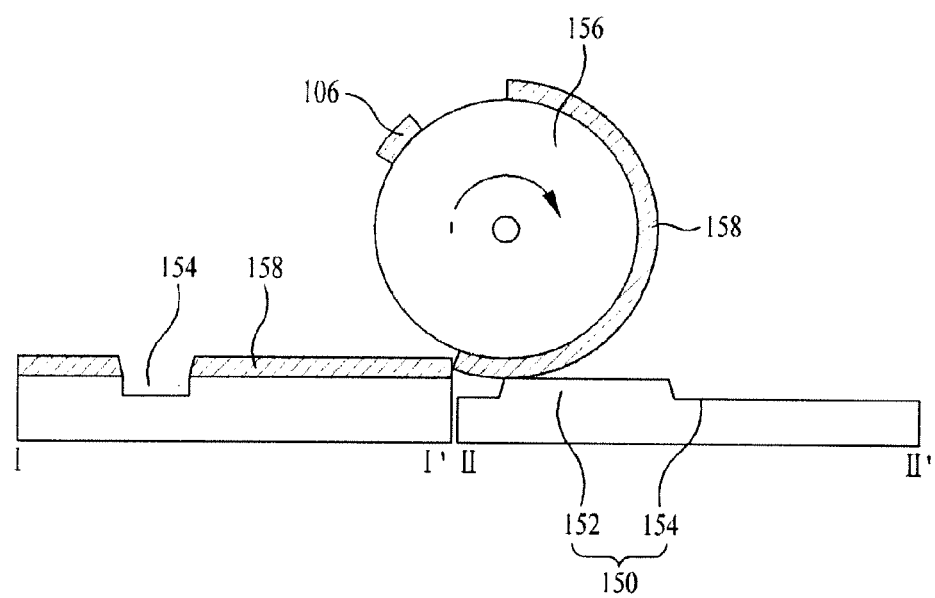

In detail, referring to FIG. 7A, a first conductive printing liquid 158 is coated on a printing roller 156 through a printing liquid supply unit 148. Then, as shown in FIG. 7B, the printing roller 156 having the first conductive printing liquid 158 coated thereon is rolled on a cliché 150 having a depressed pattern 154 and a relieved pattern 152. in this instance, the depressed pattern 154 corresponds to a region in which the LOG type signal line 132, the gate line GL and the gate electrode 106 are to be formed, and the relieved pattern 152 corresponds to a region the first opening 142 is to be formed, and a region except the LOG type signal line 132, the gate line GL and the gate electrode 106.

The printing liquid supply unit 148 at a region corresponding to the relieved pattern 152 is transcribed to the relieved pattern 152, and the first conductive printing liquid 158 at a region not corresponding to the depressed pattern 154 is left at the printing roller 156.

Figure 7C:
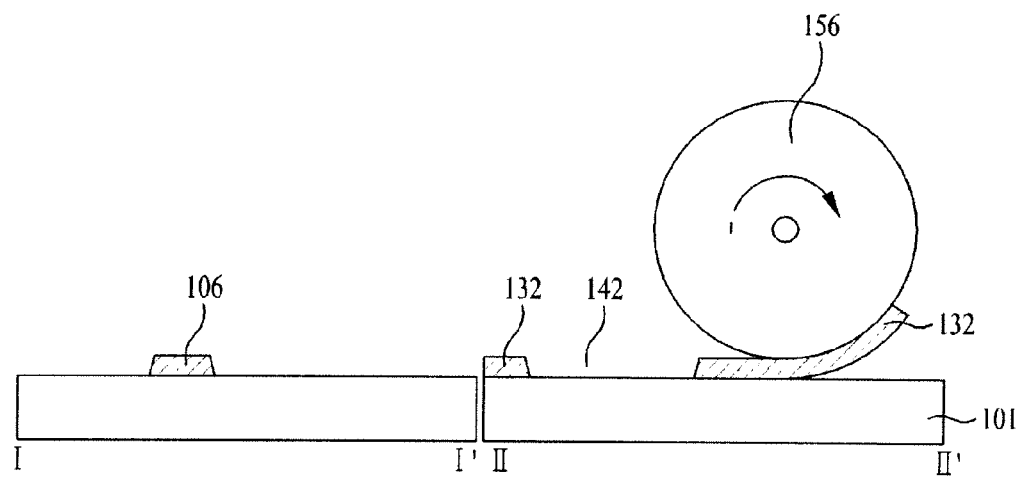

Referring to FIG. 7C, if the printing roller 156 is rolled on the substrate 101, the first conductive printing liquid 158 left on the printing roller 156 is transcribed to the substrate 101, dried and cured, to form the LOG type signal line 132 having the first opening 142, the gate pattern group having the gate line GL and the gate electrode 106.

Figure 8A:
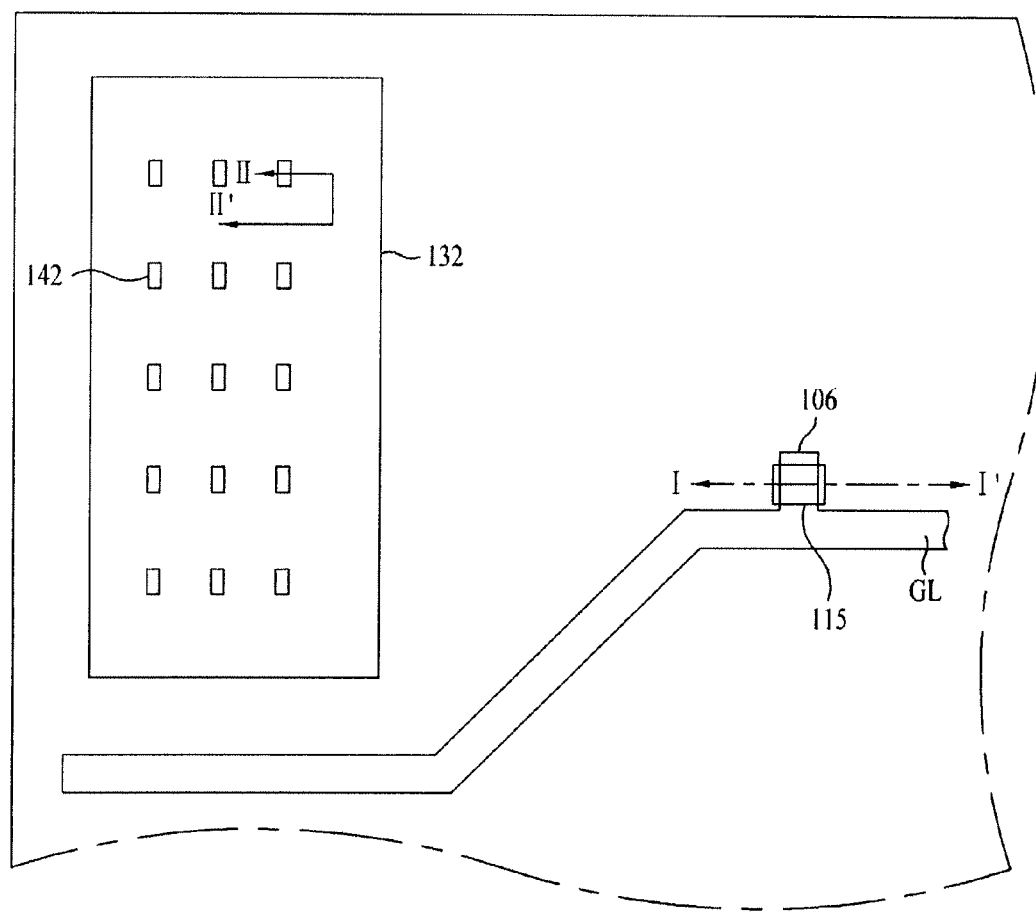
FIGS. 8A and 8B illustrate a plan view and a sectional view for explaining a method for forming the semiconductor pattern shown in FIG. 3 or 4.
Figure 8B:
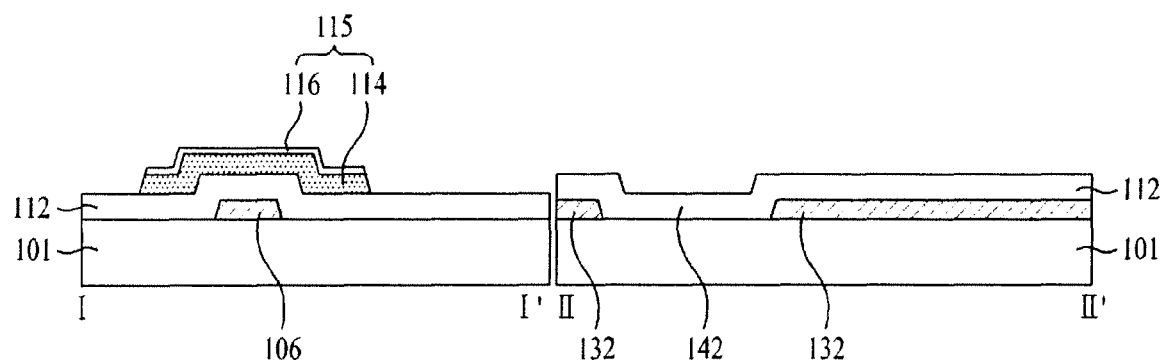

Referring to FIGS. 8A and 8B, the gate insulating film 112, and a semiconductor pattern 115 having the active layer and the ohmic layer are formed on the substrate 101 having the gate pattern group formed thereon, in succession.

In detail, inorganic insulating material, such as silicon oxide SiOx or silicon nitride SiNx is deposited on an entire surface of the substrate 101 having the gate pattern group formed thereon by PECVD or the like to form a gate insulating film 112.

Then, the printing roller having a semiconductor printing liquid coated thereon is rolled on the cliché, to transcribe the printing liquid corresponding to the relieved pattern 152 on the cliché from the printing roller to the relieved pattern 152, and the printing liquid corresponding to the depressed pattern is left on the printing roller to form the semiconductor pattern. If the semiconductor pattern having the semiconductor pattern formed thereon is rolled on the substrate, the semiconductor pattern is transcribed to the substrate, dried and cured.

Figure 9A:
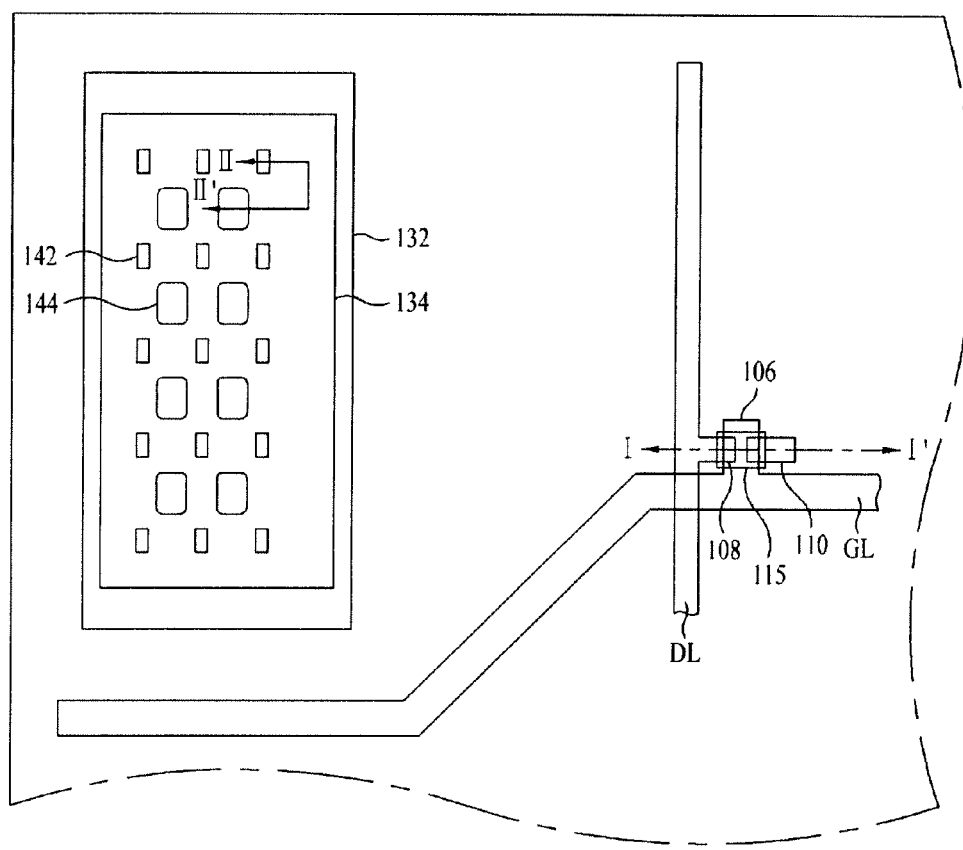
FIGS. 9A and 9B illustrate a plan view and a sectional view for explaining a method for forming the data conductive pattern shown in FIG. 3 or 4.
Figure 9B:
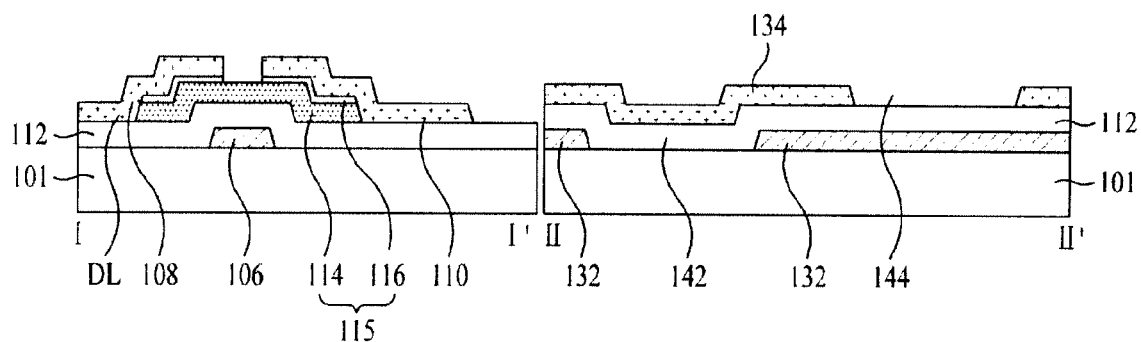

Referring to FIGS. 9A and 9B, a data pattern group including a supplementary electrode 134 having a source electrode 108, a drain electrode 110, a data line DL and a second opening 144 is formed on the substrate 101 having the semiconductor pattern 115 formed thereon.

In detail, if a printing roller having a second conductive printing liquid coated thereon is rolled on a cliché, the printing liquid at a region corresponding to the relieved pattern of the cliché is transcribed to the relieved pattern, and the printing liquid at a region corresponding to the depressed pattern is left on the printing roller to form the data pattern group. If the printing roller having the data pattern group formed thereon is rolled on the substrate, the data pattern group is transcribed to the substrate, dried and cured.

Figure 10A:
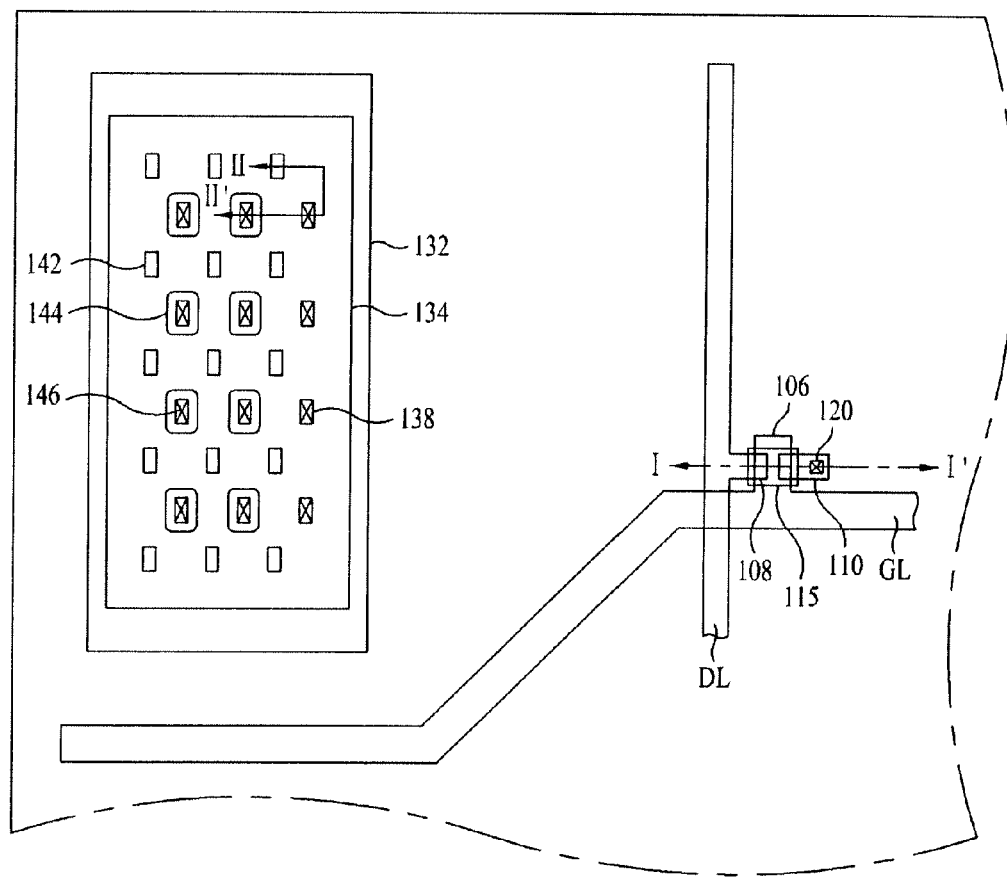
FIGS. 10A and 10B illustrate a plan view and a sectional view for explaining a method for forming the protective film shown in FIG. 3 or 4.
Figure 10B:
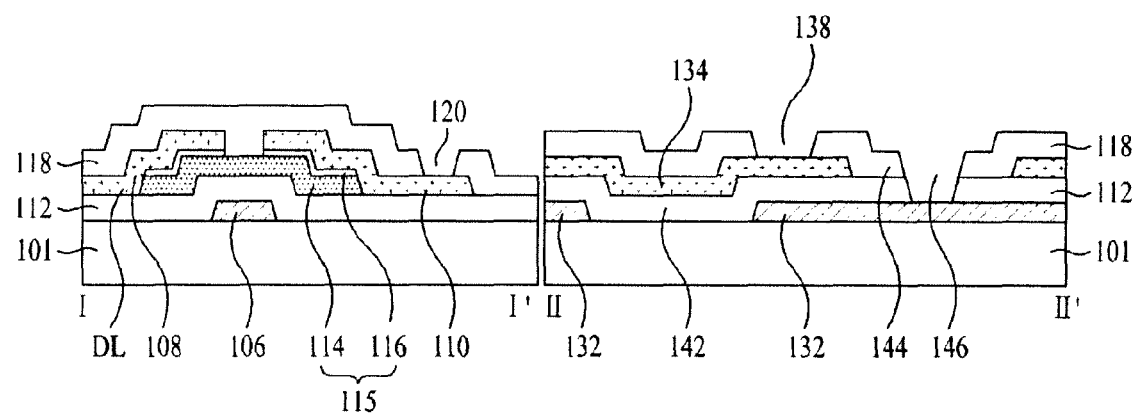

Referring to FIGS. 10A and 10B, a protective film 118 having a pixel contact hole 120 and first and second contact holes 146 and 138 is formed on the substrate 101 having the data pattern group formed thereon.

In detail, if a printing roller having a protective printing liquid coated thereon is rolled on a cliché, the printing liquid at a region corresponding to the relieved pattern of the cliché is transcribed to the relieved pattern, and the printing liquid at a region corresponding to the depressed pattern is left on the printing roller to form the protective film 118 having the pixel contact hole 120 and the first and second contact holes 146 and 138. If the printing roller including the protective film 118 having a pixel contact hole 120 and first and second contact holes 146 and 138 formed thereon is rolled on the substrate, the protective film 118 having the pixel contact hole 120 and the first and second contact holes 146 and 138 is transcribed to the substrate 101, dried and cured.

Figure 11A:
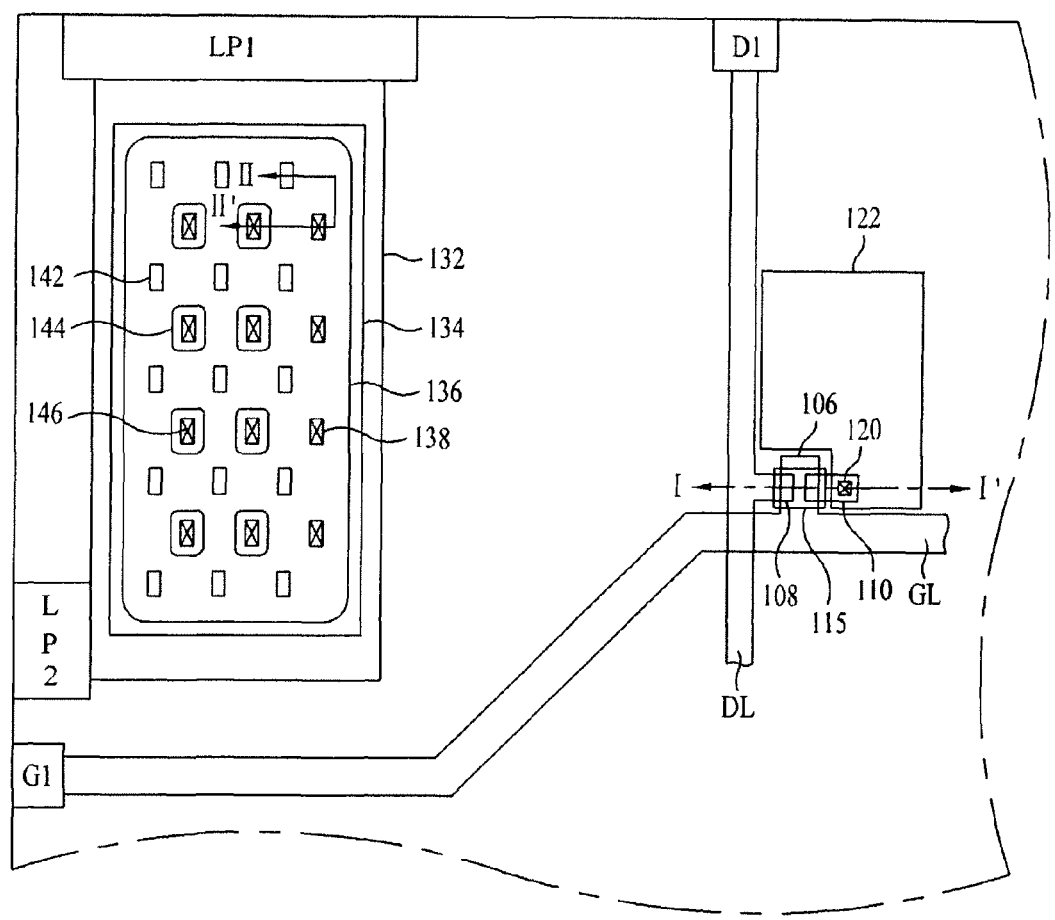
FIGS. 11A and 11B illustrate a plan view and a sectional view for explaining a method for forming the transparent conductive pattern shown in FIG. 3 or 4.
Figure 11B:
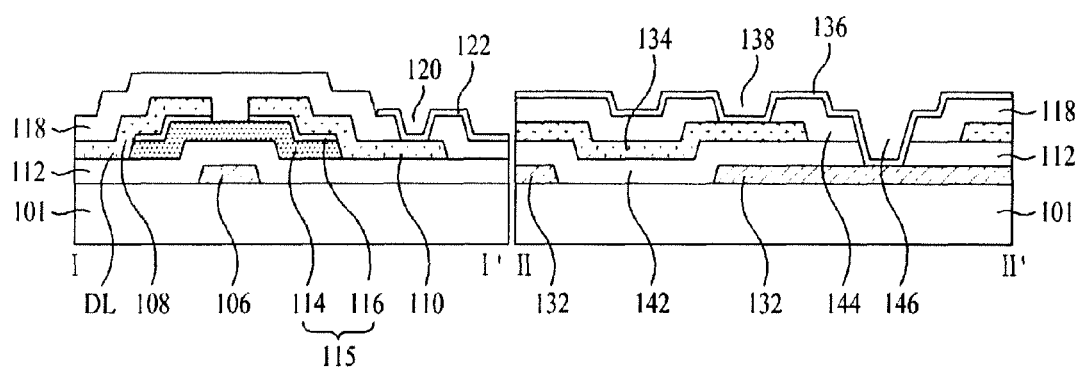

Referring to FIGS. 11A and 11B, a transparent conductive pattern group having a pixel electrode 122 and a contact electrode 136 is formed on the substrate 101 having the protective film 118 formed thereon.

Then, if a printing roller having a third conductive printing liquid coated thereon is rolled on a cliché, the printing liquid at a region corresponding to the relieved pattern of the cliché is transcribed to the relieved pattern, and the printing liquid at a region corresponding to the depressed pattern is left on the printing roller to form the transparent conductive pattern group having the pixel electrode 122 and the contact electrode 136. If the printing roller including the transparent conductive pattern group having the pixel electrode 122 and the contact electrode 136 formed thereon is rolled on the substrate, the transparent conductive pattern group having the pixel electrode 122 and the contact electrode 136 is transcribed to the substrate, dried and cured.

In the meantime, in the present invention, though formation of each of the gate pattern group, the semiconductor pattern group, the data conductive pattern group, the protective film, and the transparent conductive pattern group is described such that a relevant printing liquid is coated to the printing roller, the printing liquid is patterned at the cliché, and the patterned printing liquid is transcribed to the substrate as an example, other than this, each of the gate pattern group, the semiconductor pattern group, the data conductive pattern group, the protective film, and the transparent conductive pattern group can be formed by coating photo-sensitive resin liquid to the printing roller, patterning the photo-sensitive resin liquid at the cliché, and transcribing the photo-sensitive resin liquid patterned thus to the substrate, in which a thin film layer of each of the each of the gate pattern group, the semiconductor pattern group, the data conductive pattern group, the protective film, and the transparent conductive pattern group is etched by using the photo-sensitive resin liquid pattern as a mask.

As has been described, the liquid crystal display device, and the method for fabricating the same have the following advantages.

The electrical connection of the LOG type signal line to the supplementary electrode through the contact electrode permits a resistance value of the LOG type signal line owing to the supplementary electrode and the contact electrode. Moreover, the formation of the openings in the LOG type signal line permits to prevent the printing liquid of the LOG type signal line from coming into contact with the cliché at the time the LOG type signal line is formed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a plurality of signal lines formed at a picture display part;
   an LOG (line on glass) type signal line formed at a peripheral region of the picture display part to have a width greater than the signal lines and a plurality of first openings spaced at regular intervals for supplying a required driving signal to a drive IC to drive the signal lines;
   a supplementary electrode overlapped with the LOG type signal line, with a gate insulating film disposed therebetween;
   a first contact hole passed through a protective film formed to cover a thin film transistor connected to the signal lines and the gate insulating film to expose the LOG type signal line;
   a second contact hole passed through the protective film to expose the supplementary electrode; and
   a contact electrode connected between the supplementary electrode and the LOG type signal line through the first and second contact holes,
   wherein the supplementary electrode has second openings formed alternately with the first openings, and
   wherein the second openings are formed between the first openings.

2. The liquid crystal display device as claimed in claim 1, wherein the LOG type signal line is formed of the same material on the same plane with a gate electrode of the thin film transistor, the supplementary electrode is formed of the same material on the same plane with a drain electrode of the thin film transistor, and the contact electrode is formed of the same material on the same plane with a pixel electrode connected to the thin film transistor.

3. The liquid crystal display device as claimed in claim 1, wherein at least one of the first and second openings is formed in a slit or hole type.

\* \* \* \* \*